(12) United States Patent
Pankratz et al.

(10) Patent No.: US 8,362,864 B2
(45) Date of Patent: Jan. 29, 2013

(54) MAGNET ASSEMBLY

(75) Inventors: Anthony William Pankratz, Arvada, CO (US); Roger Scott Loving, Boulder, CO (US)

(73) Assignee: Micro Motion, Inc., Boulder, CO (US)

( * ) Notice: Subject to any disclaimer, the term of this patent is extended or adjusted under 35 U.S.C. 154(b) by 202 days.

(21) Appl. No.: 12/088,269

(22) PCT Filed: Oct. 6, 2005

(86) PCT No.: PCT/US2005/035958
§ 371 (c)(1),
(2), (4) Date: Mar. 27, 2008

(87) PCT Pub. No.: WO2007/043996
PCT Pub. Date: Apr. 19, 2007

(65) Prior Publication Data
US 2008/0211610 A1  Sep. 4, 2008

(51) Int. Cl.
*H01F 3/00* (2006.01)
*H01F 7/00* (2006.01)
(52) U.S. Cl. ........................ 335/296; 335/302
(58) Field of Classification Search .......... 335/205–206, 335/296, 302–306
See application file for complete search history.

(56) References Cited

U.S. PATENT DOCUMENTS

| | | | |
|---|---|---|---|
| 4,045,738 A * | 8/1977 | Buzzell | 324/174 |
| 4,049,475 A | 9/1977 | Houska | |
| 4,720,969 A * | 1/1988 | Jackman | 60/39.512 |
| 4,738,144 A | 4/1988 | Cage | |
| 4,876,898 A | 10/1989 | Cage et al. | |
| 5,213,251 A | 5/1993 | Wolff | |
| 5,337,033 A * | 8/1994 | Kinouchi et al. | 335/302 |
| 5,576,500 A | 11/1996 | Cage et al. | |
| 5,987,998 A | 11/1999 | Campbell et al. | |
| 6,167,589 B1 * | 1/2001 | Luedtke | 16/71 |
| 6,299,450 B1 * | 10/2001 | Honkura et al. | 433/189 |
| 6,805,012 B2 | 10/2004 | Loving et al. | |
| 6,930,413 B2 * | 8/2005 | Marzano | 310/12.18 |
| 7,378,772 B2 * | 5/2008 | Shimizu et al. | 310/156.08 |
| 7,391,291 B2 * | 6/2008 | Miyata | 335/302 |
| 7,709,987 B2 * | 5/2010 | Watanabe et al. | 310/156.21 |
| 2003/0140712 A1 | 7/2003 | Barger et al. | |

FOREIGN PATENT DOCUMENTS

| | | |
|---|---|---|
| JP | 52106499 A | 9/1977 |
| JP | 6120061 A | 4/1994 |
| JP | 8181016 A | 7/1996 |
| WO | WO-96/07081 A | 3/1996 |
| WO | 0136918 A2 | 5/2001 |
| WO | WO-2004/072591 A | 8/2004 |

* cited by examiner

*Primary Examiner* — Bernard Rojas
(74) *Attorney, Agent, or Firm* — The Ollila Law Group LLC (57) ABSTRACT

A magnet assembly (200) is provided according to the invention. The magnet assembly (200) includes at least one magnet (210), a magnet keeper (220) including a substantially planar magnet receiving face (222) for receiving the at least one magnet (210), and brazing (230) that affixes the at least one magnet (210) to the magnet receiving face (222) of the magnet keeper (220).

22 Claims, 5 Drawing Sheets

MAGNET ASSEMBLY

BACKGROUND OF THE INVENTION

1. Field of the Invention

The present invention relates to a magnet assembly, and more particularly, to a magnet assembly for a high temperature application.

2. Statement of the Problem

It is known to use Coriolis mass flow meters to measure mass flow, density, and volume flow and other information of materials flowing through a pipeline as disclosed in U.S. Pat. No. 4,491,025 issued to J. E. Smith, et al. of Jan. 1, 1985 and Re. 31,450 to J. E. Smith of Feb. 11, 1982. These flow meters have one or more flow tubes of different configurations. Each conduit configuration may be viewed as having a set of natural vibration modes including, for example, simple bending, torsional, radial and coupled modes. In a typical Coriolis mass flow measurement application, a conduit configuration is excited in one or more vibration modes as a material flows through the conduit, and motion of the conduit is measured at points spaced along the conduit.

The vibrational modes of the material filled systems are defined in part by the combined mass of the flow tubes and the material within the flow tubes. Material flows into the flow meter from a connected pipeline on the inlet side of the flow meter. The material is then directed through the flow tube or flow tubes and exits the flow meter to a pipeline connected on the outlet side.

A driver applies a force to the flow tube. The force causes the flow tube to oscillate. When there is no material flowing through the flow meter, all points along a flow tube oscillate with an identical phase. As a material begins to flow through the flow tube, Coriolis accelerations cause each point along the flow tube to have a different phase with respect to other points along the flow tube. The phase on the inlet side of the flow tube lags the driver, while the phase on the outlet side leads the driver. Sensors are placed at different points on the flow tube to produce sinusoidal signals representative of the motion of the flow tube at the different points. The phase difference between the two sensor signals is proportional to the mass flow rate of the material flowing through the flow tube or flow tubes.

A flowtube driver typically comprises a coil that is opposed by a fixed magnet. The coil and the fixed magnet are attached to a pair of flowtubes or a flowtube and a balance beam. In operation, the magnetic field in the driver coil is rapidly alternated. The fixed, opposing magnet assists in generating oscillating forces that alternatively brings the flowtube(s) together and apart.

Likewise, a pickoff sensor of a flow meter can comprise a magnetic coil pickup and an opposing magnet, with one or both being attached to flowtubes, as described above. In operation, the magnetic coil pickup generates a substantially sinusoidal signal from the moving magnet when the flowtube(s) is oscillating.

A flow meter can be used to measure a flow material in a high temperature application. Some flow meter applications require continuous use in temperatures at or above 400 degrees Fahrenheit. In the prior art, magnets used for the driver and/or pickoff sensor assemblies are held in a magnet keeper by means of a shrink fit. The magnet keeper is attached to a flow tube.

In the prior art, Aluminum-Nickel-Cobalt (AlNiCo) magnets are used in high temperature applications where flow tube stiffness is low and resulting vibrational amplitudes are high. A drawback in using AlNiCo magnets is that AlNiCo magnets have relatively higher masses than other magnet technologies while their B-field strength is relatively low. However, in newer flow meter designs, stiffness is high and vibrational amplitudes are low. As a consequence, newer flow meter designs require low mass driver and pickoff systems in order to operate properly. Simply resorting to larger magnets is not practical because the spacing between brackets is fixed by the design of the flow meter.

SUMMARY OF THE SOLUTION

The above and other problems are solved and an advance in the art is achieved through the provision of a magnet assembly according to any embodiment of the invention.

A magnet assembly is provided according to an embodiment of the invention. The magnet assembly comprises at least one magnet, a magnet keeper including a substantially planar magnet receiving face for receiving the at least one magnet, and brazing that affixes the at least one magnet to the magnet receiving face of the magnet keeper.

A magnet assembly is provided according to an embodiment of the invention. The magnet assembly comprises at least one magnet, a magnet keeper for receiving the at least one magnet, a countersink region formed in the magnet keeper, with the countersink region being configured to receive the at least one magnet, and brazing that affixes the at least one magnet in the countersink region of the magnet keeper.

A magnet assembly is provided according to an embodiment of the invention. The magnet assembly comprises at least one magnet, a magnet keeper including a substantially planar magnet receiving face for receiving the at least one magnet, and a nickel-plating layer that affixes the at least one magnet to the magnet receiving face of the magnet keeper.

A method of forming a magnet assembly is provided according to an embodiment of the invention. The method comprises placing at least one magnet onto a magnet keeper. The magnet keeper includes a substantially planar magnet receiving face for receiving the at least one magnet. The method further comprises brazing the at least one magnet to the magnet keeper. The magnet keeper is adapted to be affixed to the vibratory flow meter.

A method of forming a magnet assembly is provided according to an embodiment of the invention. The method comprises placing at least one magnet onto a magnet keeper. The magnet keeper includes a substantially planar magnet receiving face for receiving the at least one magnet. The method further comprises nickel-plating the at least one magnet to the magnet keeper. The magnet keeper is adapted to be affixed to the vibratory flow meter.

ASPECTS OF THE INVENTION

In one aspect of the magnet assembly, the at least one magnet comprises a samarium cobalt magnet.

In another aspect of the magnet assembly, the at least one magnet comprises a nickel-plated samarium cobalt magnet.

In yet another aspect of the magnet assembly, the magnet receiving face comprises a countersink region formed in the magnet keeper, with the countersink region being configured to receive the at least one magnet.

In yet another aspect of the magnet assembly, the magnet assembly further comprises a pole piece that is affixed to the at least one magnet.

In yet another aspect of the magnet assembly, the magnet assembly further comprises a pole piece that is affixed to the at least one magnet, with the pole piece including a brazing aperture.

In one aspect of the method, the at least one magnet comprises a samarium cobalt magnet.

In another aspect of the method, the at least one magnet comprises a nickel-plated samarium cobalt magnet.

In yet another aspect of the method, the magnet receiving face comprises a countersink region formed in the magnet keeper, with the countersink region being configured to receive the at least one magnet.

In yet another aspect of the method, the method further comprises affixing a pole piece to the at least one magnet.

In yet another aspect of the method, the method further comprises re-magnetizing the magnet assembly.

DESCRIPTION OF THE DRAWINGS

The same reference number represents the same element on all drawings.

DETAILED DESCRIPTION OF THE INVENTION

FIGS. 1-5 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
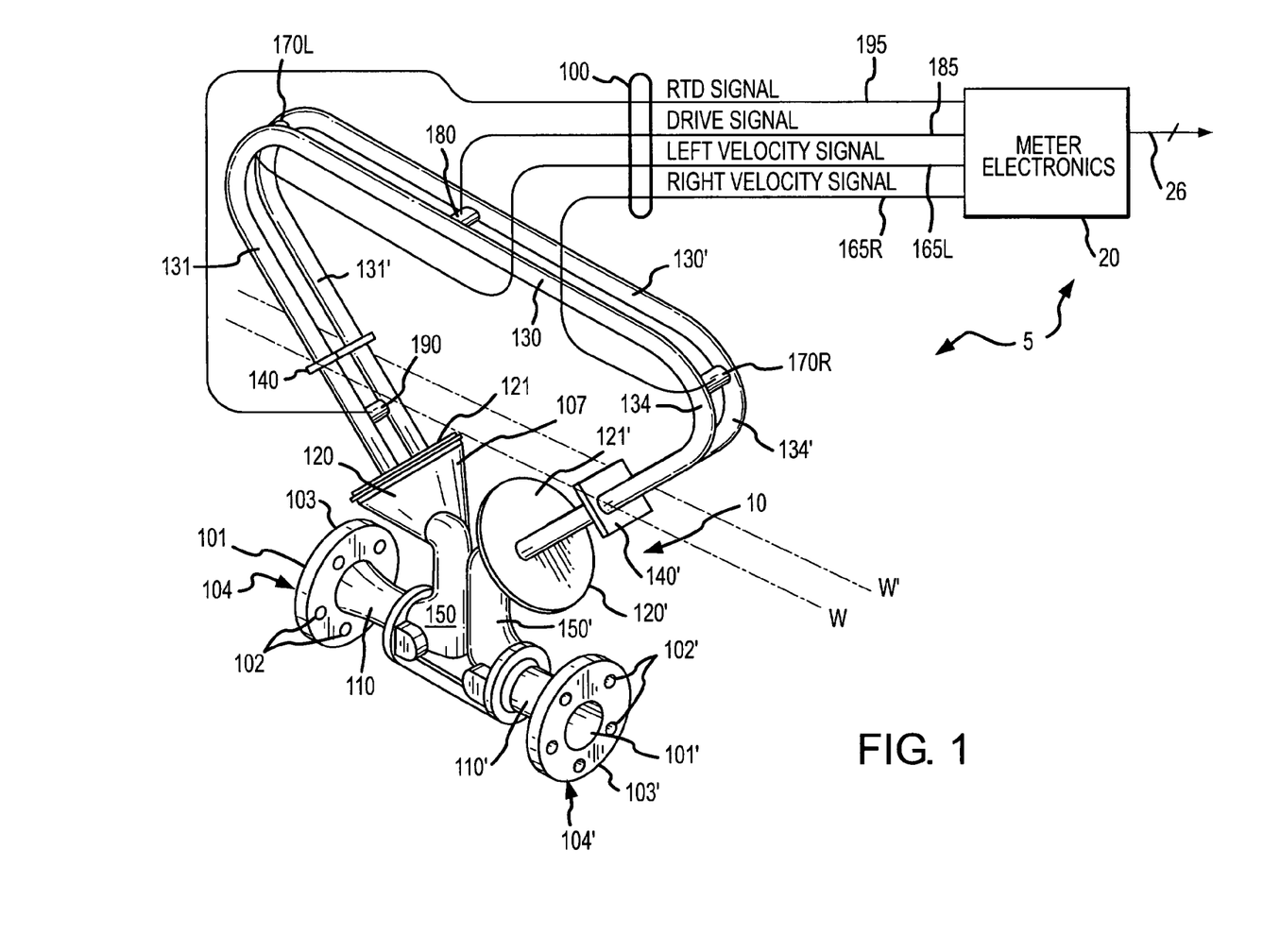
FIG. 1 shows a flow meter comprising a meter assembly and meter electronics.

FIG. 1 shows a flow meter 5 comprising a meter assembly 10 and meter electronics 20. Meter assembly 10 responds to mass flow rate and density of a process material. Meter electronics 20 is connected to meter assembly 10 via leads 100 to provide density, mass flow rate, and temperature information over path 26, as well as other information. A Coriolis flow meter structure is described although it is apparent to those skilled in the art that the present invention could be practiced as a vibrating tube densitometer without the additional measurement capability provided by a Coriolis mass flow meter.

Meter assembly 10 includes a pair of manifolds 150 and 150', flanges 103 and 103' having flange necks 110 and 110', a pair of parallel flow tubes 130 and 130', drive mechanism 180, temperature sensor 190, and a pair of velocity sensors 170L and 170R. Flow tubes 130 and 130' have two essentially straight inlet legs 131 and 131' and outlet legs 134 and 134' which converge towards each other at flow tube mounting blocks 120 and 120'. Flow tubes 130 and 130' bend at two symmetrical locations along their length and are essentially parallel throughout their length. Brace bars 140 and 140' serve to define the axis W and W' about which each flow tube oscillates.

The side legs 131, 131' and 134, 134' of flow tubes 130 and 130' are fixedly attached to flow tube mounting blocks 120 and 120' and these blocks, in turn, are fixedly attached to manifolds 150 and 150'. This provides a continuous closed material path through Coriolis meter assembly 10.

When flanges 103 and 103', having holes 102 and 102' are connected, via inlet end 104 and outlet end 104' into a process line (not shown) which carries the process material that is being measured, material enters end 104 of the meter through an orifice 101 in flange 103 and is conducted through manifold 150 to flow tube mounting block 120 having a surface 121. Within manifold 150 the material is divided and routed through flow tubes 130 and 130'. Upon exiting flow tubes 130 and 130', the process material is recombined in a single stream within manifold 150' and is thereafter routed to exit end 104' (connected by flange 103' having bolt holes 102') to the process line (not shown).

Flow tubes 130 and 130' having substantially the same Young's modulus are selected and appropriately mounted to the flow tube mounting blocks 120 and 120' so as to have substantially the same mass distribution, moments of inertia and system stiffness about bending axes W-W and W'-W', respectively. These bending axes go through brace bars 140 and 140'. Inasmuch as the Young's modulus of the flow tubes change with temperature, and this change affects the calculation of flow and density, resistive temperature detector (RTD) 190 can be mounted to flow tube 130', to continuously measure the temperature of the flow tube. The temperature of the flow tube and hence the voltage appearing across the RTD for a given current passing therethrough is governed by the temperature of the material passing through the flow tube. The temperature dependent voltage appearing across the RTD is used in a well known method by meter electronics 20 to compensate for the change in elastic modulus of flow tubes 130 and 130' due to any changes in flow tube temperature. The RTD is connected to meter electronics 20 by lead 195.

Both flow tubes 130 and 130' are driven by driver 180 in opposite directions about their respective bending axes W and W' and at what is termed the first out-of-phase bending mode of the flow meter. This drive mechanism 180 may comprise any one of many well known arrangements, such as a magnet mounted to flow tube 130' and an opposing coil mounted to flow tube 130 and through which an alternating current is passed for vibrating both flow tubes. A suitable drive signal is applied by meter electronics 20, via lead 185, to drive mechanism 180.

Meter electronics 20 receives the RTD temperature signal on lead 195, and the left and right velocity signals appearing on leads 165L and 165R, respectively. Meter electronics 20 produces the drive signal appearing on lead 185 to drive element 180 and vibrate tubes 130 and 130'. Meter electronics 20 processes the left and right velocity signals and the RTD signal to compute the mass flow rate and the density of the material passing through meter assembly 10. This information, along with other information, is applied by meter electronics 20 over path 26 to utilization means 29.

Figure 2:
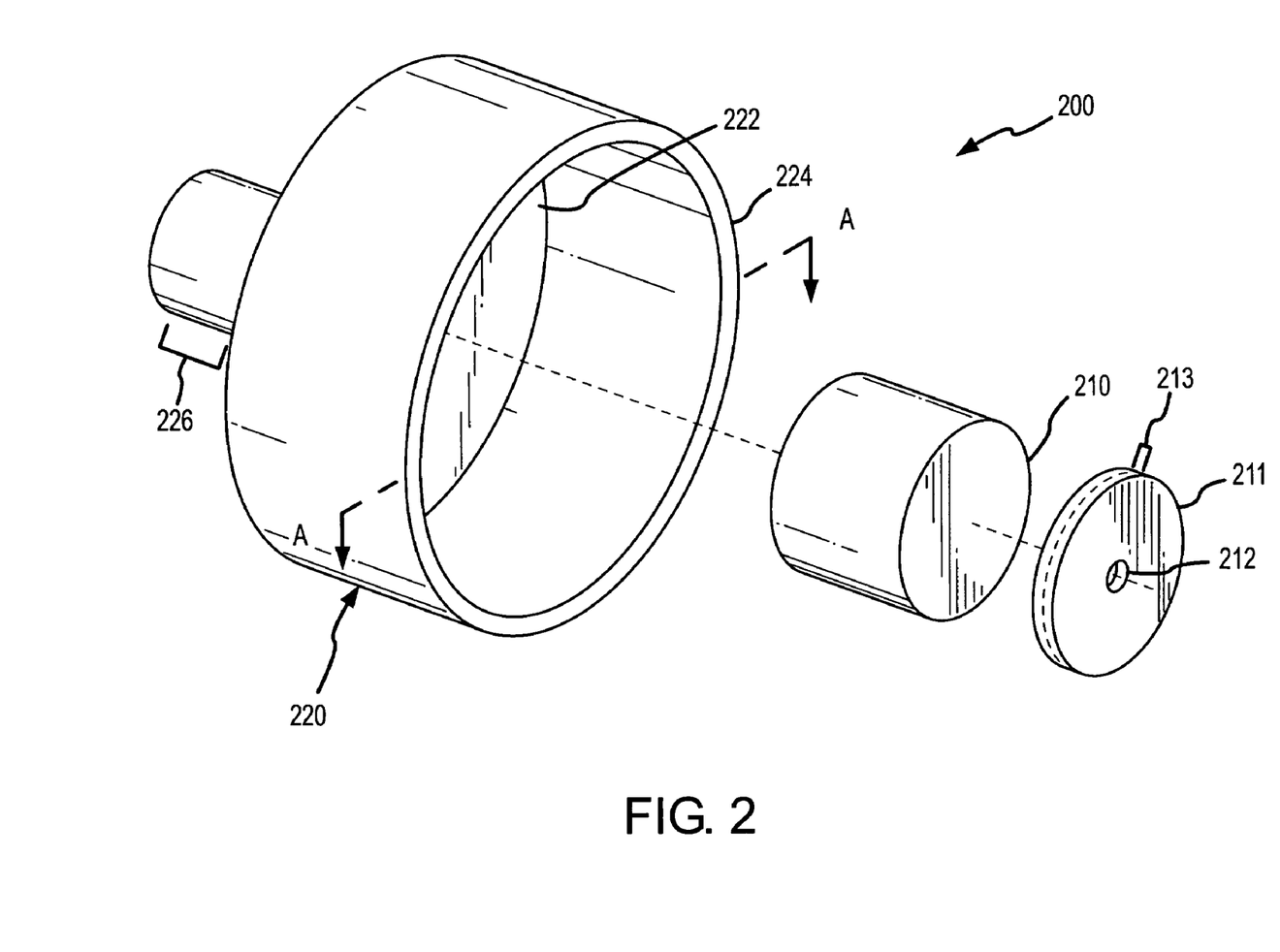
FIG. 2 shows a magnet assembly for a vibratory flow meter according to an embodiment of the invention.

FIG. 2 shows a magnet assembly 200 according to an embodiment of the invention. The magnet assembly 200 includes at least one magnet 210 and a magnet keeper 220. In one embodiment, the magnet assembly 200 is used in a meter assembly 10 of a vibratory flow meter 5. The vibratory flow meter 5 can comprise a Coriolis flow meter or a vibrating densitometer, for example.

The magnet 210 is part of a flow meter driver assembly 180 or part of a flow meter pickoff sensor 170 (see FIG. 1). The magnet 210 in the embodiment shown is substantially cylindrical. However, other magnet shapes can be employed.

The magnet 210 can comprise one or more component magnets. The magnet 210 can comprise a stack of component magnets that are brazed together, for example.

The magnet 210 in one embodiment comprises a samarium cobalt (SmCo) magnet. A SmCo magnet substantially retains its magnetic properties at high temperatures and therefore is advantageous in use with a flow meter that receives a high temperature flow material. For example, at or above 400 degrees Fahrenheit, a SmCo magnet can generate a satisfactory level of the magnetic flux needed to operate in a flow tube driver or flow tube pickoff sensor. However, it should be understood that other magnet materials can be used and are within the scope of the description and claims, such as an AlNiCo magnet, for example.

The magnet keeper 220 can comprise one or more keeper component portions. The magnet keeper 220 includes a magnet receiving face 222 that receives the magnet 210. The magnet receiving face 222 in one embodiment is substantially planar. The magnet keeper 220 can further include a wall 224 and a mounting feature 226. The wall 224 can surround the magnet 210, but does not contact the magnet 210. A gap G exists between the magnet 210 and the wall 224 (see FIG. 3), wherein a corresponding portion of the driver or sensor component can move into and out of this gap G. The wall 224 therefore can operate to constrain the magnetic flux to a region approximately between the magnet 210 and the corresponding driver or sensor component.

It should be understood that the wall 224 is not a required portion of the magnet keeper 220. The magnet keeper 220 can comprise just a base of some manner, wherein the gap G is formed between the magnet 210 and other components.

In one embodiment, the magnet 210 is nickel-plated. The nickel-plating layer extends over at least a portion of the magnet 210 and over at least a portion of the magnet receiving face 222 of the magnet keeper 220. The nickel-plating improves a high temperature performance of a SmCo magnet. In addition, the nickel-plating can provide some or all of the affixing. For example, in one embodiment of forming the magnet assembly 200, the magnet 210 is placed on the magnet receiving face 222 and then the entire magnet assembly 200 is nickel-plated. The subsequent nickel-plating in this embodiment affixes the magnet 210 to the magnet keeper 220.

This figure also shows an optional pole piece 211 that is affixed to the magnet 210. The pole piece 211 can comprise an additional magnet. Alternatively, the pole piece 211 can comprise a magnetically conductive material that functions to shape or conduct the magnetic flux from the magnet 210 to the wall 224. The pole piece 211 can include an aperture 212 that provides an opening for brazing (or otherwise affixing) the pole piece 211 to the magnet 210. In addition, the pole piece 211 can further include a rim 213 that substantially fits over the magnet 210.

Figure 3:
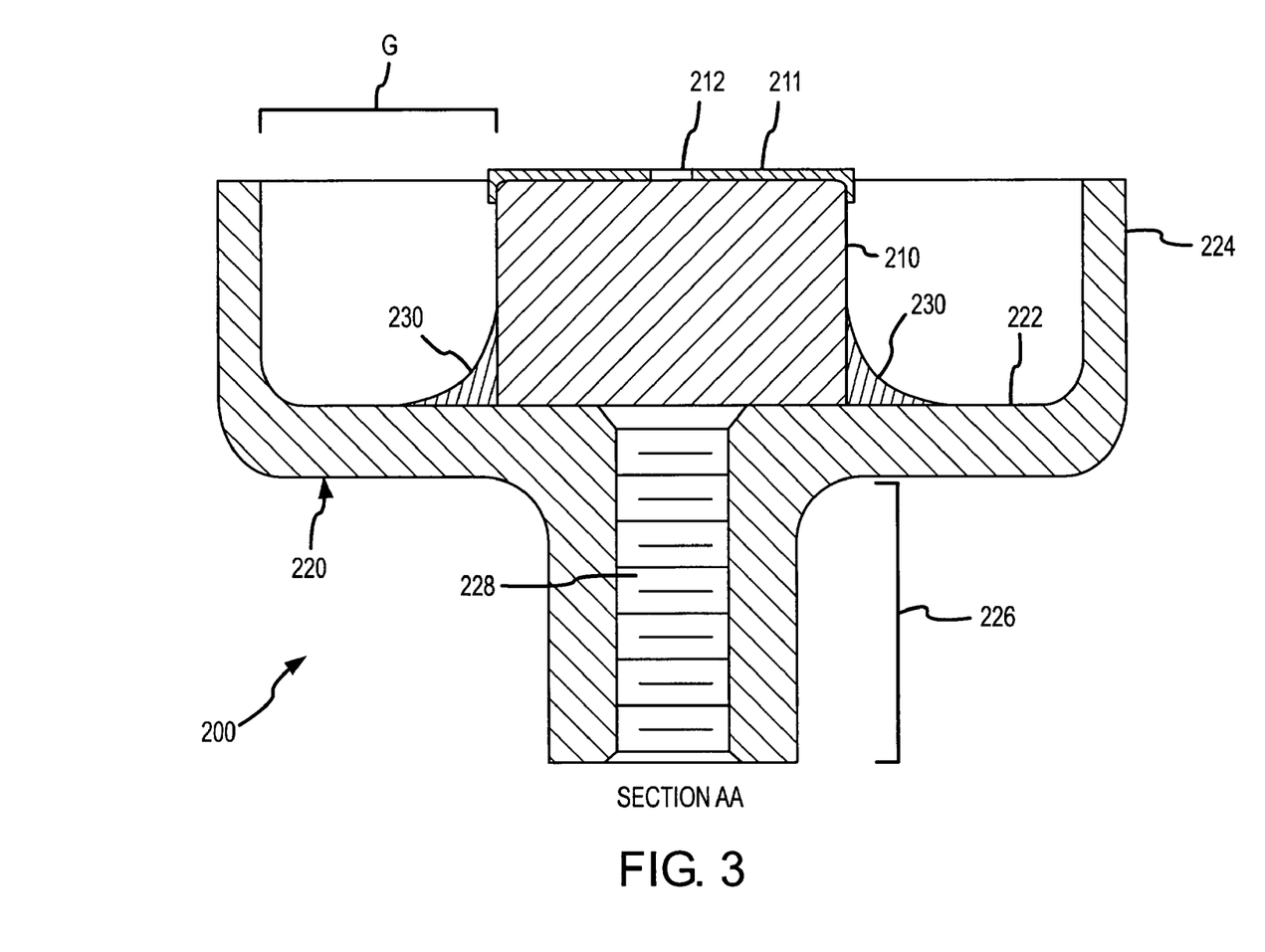
FIG. 3 is a section view AA of the magnet assembly of FIG. 2.

FIG. 3 is a section view AA of the magnet assembly 200 of FIG. 2. The section view shows brazing 230 that affixes the magnet 210 to the magnet receiving face 222 of the magnet keeper 220. The brazing 230 comprises joining similar or dissimilar metals using a melted filler metal. Brazing often uses a filler metal that includes some bronze. However, brazing can use a variety of metals, including copper, nickel, zinc, silver, and phosphorus. Brazing does not melt the base metal piece(s) being brazed, but instead the melted filler metal is distributed by capillary action. At its liquid temperature, the molten filler metal interacts with a thin layer of the base metal, cooling to form an exceptionally strong, sealed joint due to grain structure interaction. Brazing typically requires temperatures of 900 to 2200 degrees Fahrenheit, although some consider brazing to include temperatures as low as 450 degrees Fahrenheit.

This figure further shows detail of the mounting feature 226 according to an embodiment of the invention. The mounting feature 226 in the embodiment shown includes an attachment aperture 228. The attachment aperture 228 can be used to affix or removably affix the magnet keeper 220 to a flow tube or flow tube structure. The attachment aperture 228 in the embodiment shown includes threading that can receive some manner of threaded fastener. However, it should be understood that the attachment aperture 228, and indeed the entire mounting feature 226, can affix to a flow meter structure in any manner.

Figure 4:
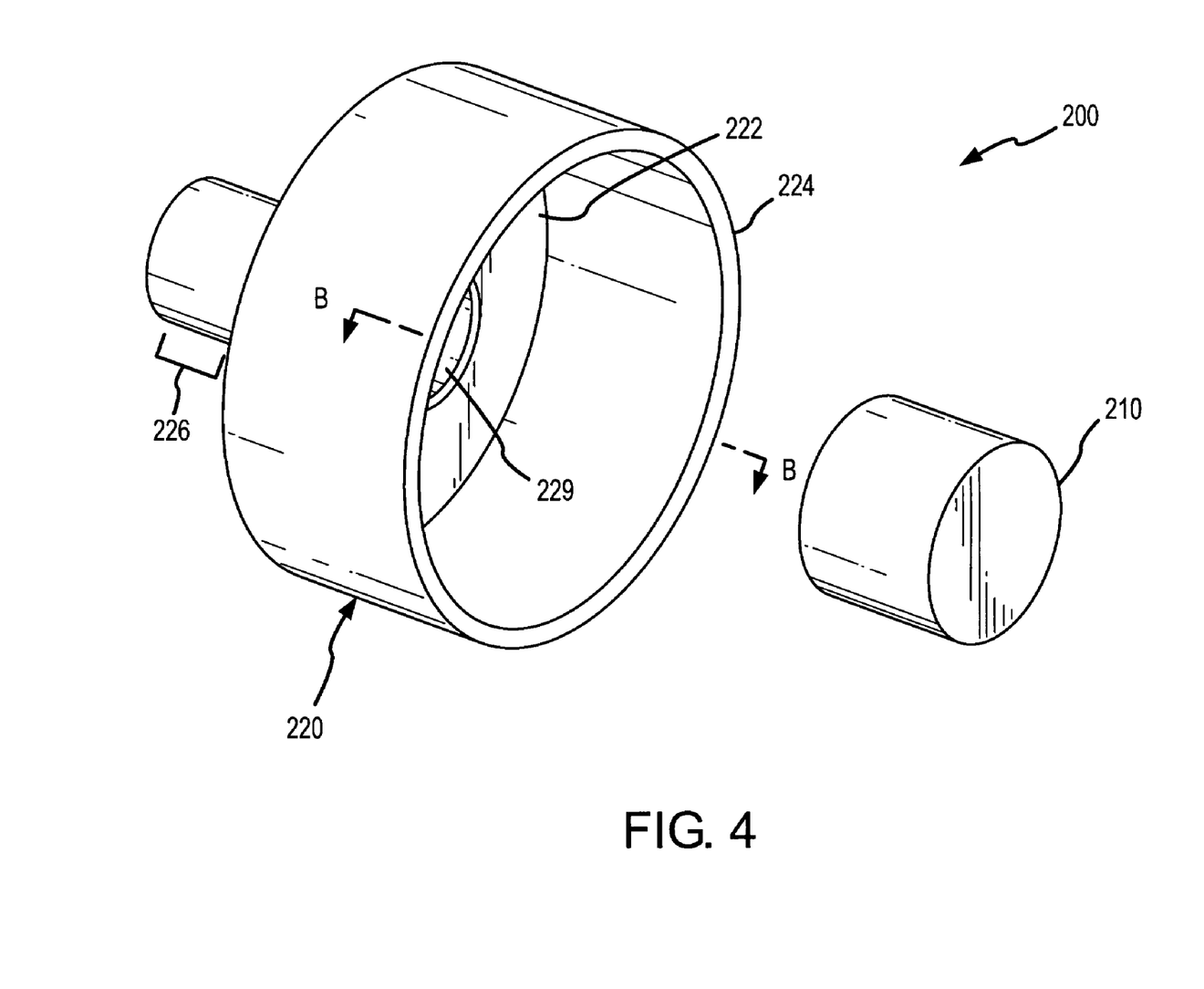
FIG. 4 shows the magnet assembly according to an embodiment of the invention.

FIG. 4 shows the magnet assembly 200 according to an embodiment of the invention. In this embodiment, the magnet receiving face 222 includes a countersink region 229 that is configured to receive the magnet 210. The countersink region 229 aids in aligning and assembling the magnet. The countersink region 229 can advantageously function to center the magnet 210 on the magnet keeper 220. In addition, the countersink region 229 can provide more area for brazing the magnet 210 to the magnet keeper 220.

Figure 5:
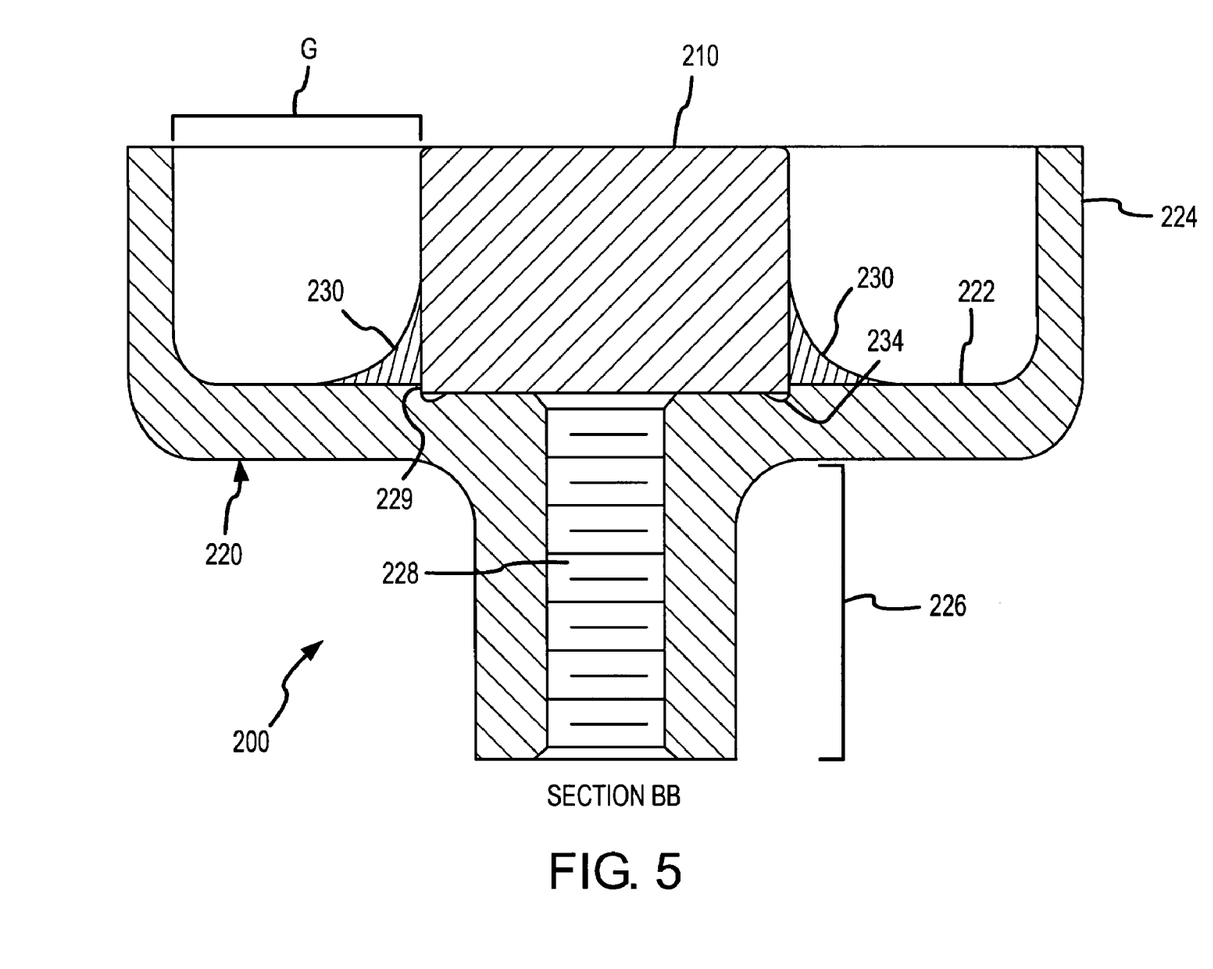
FIG. 5 is a section view BB of the magnet assembly of FIG. 4.

FIG. 5 is a section view BB of the magnet assembly 200 of FIG. 4. The section view shows the magnet 210 seated in the countersink region 229. The brazing 230 affixes the magnet 210 into the countersink region 229 and to the magnet keeper 220. As can be seen from the figure, the countersink region 229 can be substantially planar. It can also be seen from the figure that the countersink region 229 can substantially match the shape of the magnet 210. In addition, the countersink region 229 can include any manner of grooving 234 that provides extra brazing volume. Alternatively, the grooving 234 can comprise any manner of ridging, roughening, texturing, etc.

The magnet assembly 200 according to any of the embodiments can be constructed in various ways. In one method, the magnet 210 is placed against the magnet receiving face 222 of the magnet keeper 220 and brazed in place. In another method, the magnet 210 is place within the countersink region 229 of the magnet keeper 220 and brazed in place. In another method, the uncharged magnet is plated into place as a means of affixing the parts together. The brazed or plated assembly can then be subjected to a re-magnetization process. The re-magnetization process can be performed in order to substantially restore magnetic capacity that is lost due to the heat of the brazing process.

The magnet assembly according to the invention can be employed according to any of the embodiments in order to provide several advantages, if desired. The invention provides a high-temperature magnet assembly for a vibratory flow meter. The invention provides a high-temperature magnet assembly for a flow tube driver system or for a flow tube sensor system. The invention provides a strong and effective magnet mount for a vibratory flow meter. The invention provides a high-temperature magnet assembly using a samarium cobalt magnet. The invention provides a high-temperature magnet assembly using a nickel-plated samarium cobalt magnet. The invention provides a magnet mount for a samarium cobalt magnet, wherein the magnet mount does not exert a compression force on the magnet. The invention provides a high-temperature magnet assembly without increasing the size of the magnet.

We claim:

1. A magnet assembly (200), comprising:
   at least one magnet (210);
   a magnet keeper (220) including a substantially planar magnet receiving face (222) for receiving the at least one magnet (210) and a wall (224) extending generally perpendicularly away from the planar magnet receiving face (222) to define a gap (G) between the at least one magnet (210) and the wall (224);

a countersink region (229) formed in the magnet receiving face (222) of the magnet keeper (220) and spaced from the wall (224), with the countersink region (229) being configured to receive the at least one magnet (210); and brazing (230) that affixes the at least one magnet (210) in the countersink region (229) of the magnet keeper (220).

2. The magnet assembly (200) of claim 1, with the at least one magnet (210) comprising a samarium cobalt magnet.

3. The magnet assembly (200) of claim 1, with the at least one magnet (210) comprising a nickel-plated samarium cobalt magnet.

4. The magnet assembly (200) of claim 1, further comprising a pole piece (211) that is affixed to the at least one magnet (210).

5. The magnet assembly (200) of claim 1, further comprising a pole piece (211) that is affixed to the at least one magnet (210), with the pole piece (211) including a brazing aperture (212).

6. The magnet assembly (200) of claim 1, with the countersink region (229) including grooving (234).

7. A magnet assembly (200), comprising:
   at least one magnet (210);
   a magnet keeper (220) including a substantially planar magnet receiving face (222) for receiving the at least one magnet (210);
   a pole piece (211) affixed to the at least one magnet (210) and substantially opposite the magnet receiving face (222); and
   a nickel-plating layer that affixes the at least one magnet (210) to the magnet keeper (220) and to the pole piece (211).

8. The magnet assembly (200) of claim 7, with the at least one magnet (210) comprising a samarium cobalt magnet.

9. The magnet assembly (200) of claim 7, with the magnet receiving face (222) comprising a countersink region (229) formed in the magnet keeper (220), with the countersink region (229) being configured to receive the at least one magnet (210).

10. The magnet assembly (200) of claim 7, with the pole piece (211) including a brazing aperture (212).

11. The magnet assembly (200) of claim 7, with the countersink region (229) including grooving (234).

12. A method of forming a magnet assembly, comprising:
    placing at least one magnet onto a magnet keeper, with the magnet keeper including a substantially planar magnet receiving face including a countersink region configured for receiving the at least one magnet and a wall extending generally perpendicularly away from the planar magnet receiving face and spaced from the countersink region; and
    affixing the at least one magnet in the countersink region of the magnet keeper, wherein the magnet keeper is adapted to he affixed to a vibratory flow meter.

13. The method of claim 12, with the at least one magnet comprising a samarium cobalt magnet.

14. The method of claim 12, with the affixing comprising brazing or nickel-plating the at least one magnet in the countersink region.

15. The method of claim 12, further comprising affixing a pole piece to the at least one magnet.

16. The method of claim 12, further comprising re-magnetizing the magnet assembly.

17. The method of claim 12, with the countersink region including grooving.

18. A magnet assembly (200), comprising:
    at least one magnet (210);
    a magnet keeper (220) including a substantially planar magnet receiving face (222) for receiving the at least one magnet (210) and a wall (224) extending generally perpendicularly away from the planar magnet receiving face (222) to define a gap (G) between the at least one magnet (210) and the wall (224);
    a countersink region (229) formed in the magnet receiving face (222) of the magnet keeper (220) and spaced from the wall (224), with the countersink region (229) being configured to receive the at least one magnet (210); and
    a nickel-plating layer extending over substantially the entire magnet assembly (200) and affixing the at least one magnet (210) in the countersink region (229) of the magnet keeper (220).

19. The magnet assembly (200) of claim 18, with the at least one magnet (210) comprising a samarium cobalt magnet.

20. The magnet assembly (200) of claim 18, further comprising a pole piece (211) that is affixed to the at least one magnet (210).

21. The magnet assembly (200) of claim 18, further comprising a pole piece (211) that is affixed to the at least one magnet (210), with the pole piece (211) including a brazing aperture (212).

22. The magnet assembly (200) of claim 18, with the countersink region (229) including grooving (234).

* * * * *

UNITED STATES PATENT AND TRADEMARK OFFICE
CERTIFICATE OF CORRECTION

PATENT NO. : 8,362,864 B2
APPLICATION NO. : 12/088269
DATED : January 29, 2013
INVENTOR(S) : Anthony William Pankratz et al.

It is certified that error appears in the above-identified patent and that said Letters Patent is hereby corrected as shown below:

In the Claims

Column 8, Line 6, replace "he" with --be--

Signed and Sealed this
Twenty-second Day of October, 2013

Teresa Stanek Rea
*Deputy Director of the United States Patent and Trademark Office*